United States Patent [19]

Labib et al.

[11] Patent Number: 4,522,747
[45] Date of Patent: Jun. 11, 1985

[54] CAPACITANCE ELECTRONIC DISC MOLDING COMPOSITIONS

[75] Inventors: Mohamed E. Labib, Princeton; Robert F. Poll, Somerset; Chih-Chun Wang, Hightstown, all of N.J.

[73] Assignee: RCA Corporation, Princeton, N.J.

[21] Appl. No.: 624,821

[22] Filed: Jun. 26, 1984

[51] Int. Cl.³ .............................................. H01B 1/06
[52] U.S. Cl. .................................... 252/511; 252/510; 524/296; 369/286; 369/276; 346/137
[58] Field of Search ...................... 252/511, 510, 506; 524/495, 496, 296; 274/41 A, 1 R; 523/174; 358/342, 344; 264/104, 105; 369/126, 276, 280, 286, 288; 428/64, 65; 346/137

[56] References Cited

U.S. PATENT DOCUMENTS

| | | | |
|---|---|---|---|
| 4,102,862 | 7/1978 | Monte et al. | 524/287 |
| 4,202,810 | 5/1980 | Monte et al. | 524/299 |
| 4,228,050 | 10/1980 | Martin et al. | |
| 4,275,101 | 6/1981 | Wang et al. | 369/286 |
| 4,280,941 | 7/1981 | Datta et al. | 252/511 |
| 4,330,583 | 5/1982 | Datta et al. | 428/65 |
| 4,351,747 | 9/1982 | Miyamoto et al. | 252/511 |
| 4,355,062 | 10/1982 | Wang et al. | 428/64 |
| 4,378,310 | 3/1983 | Datta et al. | 524/495 |
| 4,383,961 | 5/1983 | Nyman et al. | 264/107 |
| 4,384,055 | 5/1983 | Okuda et al. | 524/495 |
| 4,390,459 | 6/1983 | Koral et al. | 252/511 |
| 4,399,061 | 8/1983 | Sickert | 252/511 |
| 4,412,941 | 11/1983 | Probst et al. | 252/511 |
| 4,416,807 | 11/1983 | Datta et al. | 252/511 |
| 4,465,615 | 8/1984 | Hata et al. | 252/511 |
| 4,465,616 | 8/1984 | Nelson et al. | 252/511 |
| 4,465,617 | 8/1984 | Whipple et al. | 252/511 |

OTHER PUBLICATIONS

Williams and Wang, RCA Review, vol. 43, pp. 224–227, Mar. 1983.

Primary Examiner—Josephine L. Barr
Attorney, Agent, or Firm—Birgit E. Morris; R. Hain Swope

[57] ABSTRACT

An improved conductive molding composition for the preparation of high density capacitance electronic discs is disclosed. The disclosed compositions are improved by the utilization of a solid plasticizer, cumylphenyl isophthalate, represented by the formula

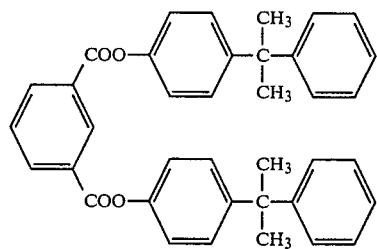

The use of this plasticizer permits the formulation of a conductive molding composition wherein all ingredients are solids.

9 Claims, No Drawings

CAPACITANCE ELECTRONIC DISC MOLDING COMPOSITIONS

This invention relates to an improved solid plasticizer for conductive molding compositions utilized to prepare high density information discs known as capacitance electronic discs ("CEDs").

BACKGROUND OF THE INVENTION

Martin et al., U.S. Pat. No. 4,228,050, discloses a complex molding composition for the compression molding of high density information records such as CEDs. This composition, in essence, comprises a thermoplastic resin, preferably a vinyl chloride-based polymer or copolymer, and sufficient finely divided conductive carbon black to provide capacitive playback of discs prepared therefrom. Typically, such compositions have a bulk resistivity of below about 500 ohm-cm at 900 mHz. The composition disclosed by Martin et al. additionally contains both liquid and solid additives such as stabilizes, lubricants, plasticizers, processing aids and the like. In addition to the function of these ingredients in the formulation, e.g. as a lubricant, the selection of each required consideration of their stability during the processing and molding of the formulation and the possibility of reactions among any two or more ingredients and/or their degradation or reaction products.

It will be appreciated that, because of the numerous possibilities for reactions in a large formulation such as disclosed by Martin et al, particularly in the heat and pressure of the molding process, it would be advantageous to significantly reduce the number of ingredients there. Datta, in copending application Ser. No. 452,915, filed Dec. 12, 1982, and Labib et al., in copending application Ser. No. 549,560, filed Nov. 7, 1983, now abandoned, disclose improved formulations containing few ingredients. The simplified formulations disclosed in these applications additionally possess other advantages such as avoiding the need for the conventional step of washing the surface of the disc after pressing.

In accordance with this invention, a specific plasticizer has been found which further improves CED conductive molding compositions.

SUMMARY OF THE INVENTION

Conductive molding compositions for CEDs are improved by the inclusion of a solid phthalate compound as a plasticizer.

DETAILED DESCRIPTION OF THE INVENTION

The improved solid plasticizer incorporated into the conductive molding compositions for capacitive electronic discs ("CEDs") in accordance with this invention is cumylphenyl isophthalate, represented by the formula

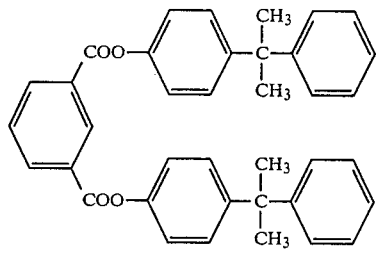

This compound, which is commercially available from Kenrich Petrochemicals, Inc. under the tradename ESB-EC, has a melting point of 80° C.

The improved plasticizer of this invention has a number of significant advantages. First, it permits the preparation of conductive molding compositions from ingredients which are all solids at ambient temperatures. This is advantageous in that one need not to be concerned with whether a small quantity of one or more liquid components has been uniformly dispersed throughout a powder composition, as has been case with previous formulations.

Second, the use of the subject plasticizer provides a composition without a migrable component during the useful life of CEDs prepared therefrom. It has been found that the liquid plasticizers used heretofore, particularly diundecyl phthalate, have a tendency to migrate to the surface of the disc to a significant degree over a period of time. If has further been shown that the liquid plasticizer can be present in the surface lubricant in a significant quantity, i.e. up to about thirty percent by weight after a year's storage, and can interact with dust from the caddy which encases commercial CEDs to cause carrier distress which can be severe when the CED surface is being rapidly scanned.

In addition, CEDs prepred utilizing the subject improved plasticizer demonstrate excellent solvent resistance, excellent resistance to water and humidity stress, superior aging characteristics, an improved glass transition temperature and are otherwise at least equal to conventional CEDs. In addition, because the subject plasticizer is a solid and, therefore, can be incorporated into conductive molding compositions for CEDs at higher concentrations than conventional liquid plasticizers, such as diundecyl phthalate, the resulting conductive molding compositions have a much lower melt viscosity and, therefore, are easier to process. The subject plasticizers are particulatly advantageous in formations such as those disclosed by Datta or Labib et al. which contain fewer ingredients and need not be washed after pressing. The conductive molding compositions prepared according to this invention contain from about 3 to about 10, preferably from about 4 to about 8 percent by weight of cumylphenyl-isophthalate.

The resin component of the subject CEDs can be a homopolymer or copolymer of vinyl chloride, or a mixture thereof as disclosed by Martin et al., a homopolymer of styrene, or an acrylic monomer, or their copolymers as disclosed by Datta et al. in U.S. Pat. No. 4,416,807, issued Nov. 22, 1983, or the like. Poly(vinyl chloride) is presently preferred for the subject discs. A particularly suitable resin is a vinyl chloride homopolymer commercially available from B. F. Goodrich Company as Geon 110×346. This resin has a weight average molecular weight of approximately 84,000, a number average molecular weight of approximately 38,000 and a Tg of appproximately 88° C.

Suitable conductive carbon blacks include low density blacks such as Ketjenblack EC of the Armak Company or CSX-200A of Cabot Corporation. Such carbon blacks have a low bulk density, i.e. about 140–160 grams per liter, an average particle size of about 300 angstroms, a high surface area and a high proportion of voids within the particles as measured by dibutylphthalate absorption.

The CED's of this invention contain, in addition to the subject plasticizers, from about 70 to 80, preferably from about 75 to 78, percent by weight of the resin; from about 12 to 20, preferably from about 15 to 18, percent by weight of conductive carbon black particles; and up to about 7, preferably from about 1 to 5, percent by weight of other additives selected from the following groups. It will be appreciated that only those members of the herein-named groups of additives which are solid at ambient temperatures are suitable for the conductive molding compositions of this invention.

Suitable lubricants include fatty acids such as stearic acid, esters thereof, polyfunctional acid and alcohol esters, soaps including calcium and zinc stearates, fatty acid amides such as stearic acid amide, oleamide and ethylene-bis-stearamide, silanes such as dimethylsiloxane, commercial mixed organic ester preparations such as Loxiol 7109, available from Henkel International Gmbh, and the like. The subject CEDs suitably contain from about 0.5 to about 3, preferably from about 0.75 to 1.5, percent by weight of a lubricant. The subject conductive molding compositons may also contain other solid additives such as an acrylic flow modifier and high temperature lubricant available from Rohm & Haas Co. under the trademark Acryloid K-175, suitably in from 0 to 3, preferably from about 0.75 to 1.5, percent by weight.

Suitable stabilizers include solid organ-metallic compounds containing tin, lead, zinc, barium or cadmium, epoxides, phosphites, alkylated phenols and the like. A suitable stabilizer is an organo-tin maleate available from M & T Chemicals, Inc. under the trademark Thermolite T-49. A particulary suitable group of stabilizers for the subject compositions are the members of a group of tin mercapto esters and alkyl mercaptides disclosed by Labib et al. in copending application RCA Docket No. 81,034 which are solids at ambient temperatures. These compounds are represented by the formulae

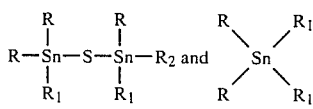

ps wherein
R is a straight-chain alkyl radical having 4 to 8 carbon atoms;
$R_1$ is selected from $-S-CH_2-COOR_3$ and $-S-R_3$;
$R_2$ is R or $R_1$; and
$R_3$ is a straight-chain alkyl group having 8 to 18 carbon atoms.

Preferred amount these compounds are those wherein R is butyl or octyl, $R_2$ is $-S-CH_2-COOR_3$ and $R_3$ contains from 10 to 14 carbon atoms. The primary function of the stabilizer is to neutralize volatiles formed as decomposition products of the resin. The subject conductive molding compositions suitably contain from about 1 to about 5, preferably from about 3 to about 4 percent by weight of the stabilizer.

The individual components of the conductive molding composition are comminuted to a fine particle size. In particular, the conductive carbon black suitably contains substantially no particles larger than about 10 micrometers. Commercial grinding apparatus such as air jet pulverizers is suitable for this purpose. The solid ingredients are comminuted individually or in groups of two or more. The pulverizing procedure may be carried out separate from or ancillary to blending of the solid ingredients. Any large particles, e.g. carbon black agglomerates, that remain after the comminution can be removed by physical separation, e.g. sieving the blend.

The blended conductive molding composition may suitably be molded directly after comminution and blending or, preferably, be thermally processed, i.e. it is heated under high shear to form a melt having the carbon particles uniformly dispersed therein. Thermal processing is preferably carried out by extruding the conductive composition in a Buss Condux Kneading Extruder, or other suitable apparatus. The composition is passed through a die, pelletized and stored. High density information discs, i.e. CEDs, are prepared from the conductive molding composition, whether thermally processed or not, by compression molding at about 325°–380° F. (163°–190° C.).

The surface of the subject CEDs is suitably lubricated with, e.g. a fractionated methylalkyl siloxane lubricant such as disclosed in U.S. Pat. No. 4,275,101, issued June 23, 1981, preferably doped with an additive such as disclosed in U.S. Pat. No. 4,330,583, issued May 18, 1982, or U.S. Pat. No. 4,355,062 issued Oct. 19, 1982. The lubricant is suitably applied to the disc surface as a fine mist.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

A conductive molding composition was prepared by combining in a Welex mixer 74.5 parts of Geon 110×346 poly(vinyl chloride) of the B. F. Goodrich Company; 3.5 parts of Thermolite T-49, organo-tin maleate of M & T Chemical Company; 0.75 part of Acryloid K-175; 0.75 part of Loxiol 7109; 5.0 parts of cumylphenyl isophthalate plasticizer and 15.5 parts of CSX-200A, conductive carbon black particles of the Cabot Carbon Company. The mixture was thoroughly blended until its temperature reached 113°.

The mixture was allowed to cool to ambient and then fed to a Buss Condux Kneading Extruder and melt-extruded in the form of a pelletized molding composition. Thereafter, capacitive electronic discs were compression molded from the pelletized composition.

CONTROl 1

A conductive molding composition was prepared according to the procedure of Martin et al. by mixing until thoroughly blended: 15 parts of CSX-200A carbon black; 77.5 parts of the resin of Example 1; 0.75 part of Loxiol 7109; 1.0 part of Acryloid K-175 and 2.0 parts of dibutyltin-β-mercaptopropionate, Thermolite T-35 of M & T Chemical Company. The following liquid ingredients were added to the solids with mixing: 1.0 part of dibutyltin maleate stabilizer, Mark 275 of Argus Chemical Corporation, and 2.0 parts of diundecyl phthalate plasticizer. Mixing was continued until the temperature reached 113°. The mixture was cooled, extrusion-melted and compression molded as in Example 1.

EXAMPLE 2

Groups of 12 discs were tested as follows. The discs prepared in Example 1 and the control, which represents standard production discs, were tested as pressed and processed according to the process disclosed in U.S. Pat. No. 4,383,961, which includes washing, rinsing and drying treatments. Discs from Example 1 and the control, both as-pressed and treated, were spin-rinsed in heptane for 10 seconds. Experience has shown that heptane treatment significantly increases carrier distress of discs prepared from a conventional formulation such as the control. Experience has likewise shown that carrier distress of such standard discs is generally improved by the washing treatment.

The discs were tested for carrier distress. Carrier distress is a measure of the distortion, loss of signal or dropout of the audio, video and color information coming from the CED. The carrier distress time is measured by adding the amount of time in seconds (but discounting intervals of less than 10 microseconds) during disc playback when the r.f output of the player arm is less then 150 millivolts peak-to-peak, and the time when the r.f. output gives above 8.6 megahertz or below 3.1 megahertz in frequency, indicating a defect. Such defects are noted by the viewer as dropouts, up to a complete loss of the picture and sound information. The present acceptable level of carrier distress for a video disc is 3 seconds in one hour of playback time. The effect of solvents on the CEDs tested is shown in Table I.

TABLE I

| Carrier Distress (Seconds/hour of playback) | | |
| --- | --- | --- |
| | Example 1 | Control |
| As-pressed | 0.012 | 0.008 |
| As-pressed + Heptane | 0.055 | 50.80 |
| Washed | 0.098 | 0.53 |
| Washed + Heptane | 0.553 | 35.87 |

The superior resistance to solvent effects such heptane and also to water and, therefore, humidity are clearly demonstrated by the data in Table I.

Discs from Example 1 and the control were lubricated with a doped lubricant composition as disclosed by Wang et al. in U.S. Pat. No. 4,355,062 and subjected to a high temperature-high humidity stress by being placed in a chamber maintained by 95% relative humidity and 100° F. (37.7°) for a period of 48 hours and played again. The results are set forth herein below in Table II

TABLE II

| Carrier Distress (sec./hour of playback) | | | |
| --- | --- | --- | --- |
| | Median | Range | Percent >3 sec. |
| Example 1 | | | |
| As-pressed | 0.64 | 0–18.0 | 18 |
| Control | | | |
| As-pressed | 6.11 | 0.57–36.0 | 67 |
| Washed | 2.66 | 0.14–17.0 | 30 |

These results further demonstrate the superior resistance of the formulations of this invention.

EXAMPLE 3

Groups of as-pressed CEDs from Example 1 and the control batch were tested for capillary flow and spreading characteristics of a lubricant using the method described by Williams and Wang in RCA Review, Vol. 43, pages 224–227, March, 1983. The lubricant utilized was that used to lubricate the CEDs tested in Example 2. Washed CEDs from both batches were tested in the same manner. It was determined that the as-pressed CEDs of Example 1 had an average normalized mobility of 109 cm/second[½] as compared to 100 for the control. Washing the disc surface actually decreased the mobility of the CEDs of Example 1 to 97 cm/second[178] whereas washing increased that of the control to 118. The surface quality of the CEDs of this invention is clearly superior as-pressed to the conventional CEDs, thereby eliminating the need for costly washing and handling procedures.

We claim:

1. In a conductive molding composition for a capacitive electronic disc comprising from about 70 to about 80 percent by weight of a thermoplastic resin selected from the group consisting of: a homopolymer or copolymer of vinyl chloride, or a mixture thereof; and a homopolymer of styrene or an acrylic monomer, or their copolymers; from about 12 to about 20 percent by weight of finely divided conductive carbon black; from about 1 to about 5 percent by weight of a compatible stabilizer, from about 0.5 to about 3 percent of a compatible lubricant, from about 3 to about 10 percent by weight of a compatible plasticizer, and from 0 to about 3 percent by weight of a compatible modifier, the improvement wherein all ingredients of said composition are solids and the plasticizer is cumylphenyl isophthalate, represented by the formula

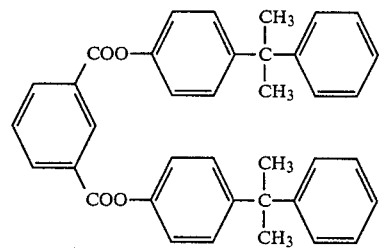

2. An improved molding composition in accordance with claim 1, wherein said composition comprises; 75 to about 78 percent by weight of the resin; from about 15 to about 18 percent by weight of the conductive carbon black; from about 3 to about 4 percent by weight of the stabilizer; from about 0.75 to about 1.5 percent of the lubricant; from about 4 to about 8 percent by weight of the plasticizer; and from about 0.75 to about 1.5 percent by weight of the modifier.

3. An improved molding composition in accordance with claim 1, wherein the resin is a homopolymer or copolymer of vinyl chloride.

4. An improved molding composition in accordance with claim 3, wherein the resin is poly(vinyl chloride).

5. An improved molding composition in accordance with claim 1, wherein the stabilizer is an organo-tin maleate.

6. A high density capacitance electronic disc prepared by compression molding the improved conductive molding composition of claim 1.

7. An improved capacitance electronic disc in accordance with claim 6, wherein said disc contains: from about 75 to about 78 percent by weight of the resin; from about 15 to about 18 percent by weight of the conductive carbon black; from about 3 to about 4 percent by weight of the stabilizer; from about 0.75 to about 1.5 percent of the lubricant, from about 4 to about 8 percent by weight of the plasticizer; and from about 0.75 to about 1.5 percent by weight of the modifier.

8. An improved capacitance electronic disc in accordance with claim 6, wherein the resin is a homopolymer or copolymer of vinyl chloride.

9. An improved capacitance electronic disc in accordance with claim 8, wherein the resin is poly(vinyl chloride).

* * * * *